US 6,409,194 B1

(12) United States Patent  
Voas (10) Patent No.: US 6,409,194 B1
(45) Date of Patent: Jun. 25, 2002

(54) TRAILER AND METHOD OF USE (76) Inventor: Stanley G. Voas, 401 Wilson Ave. SE., St. Cloud, MN (US) 56304

( * ) Notice: Subject to any disclaimer, the term of this patent is extended or adjusted under 35 U.S.C. 154(b) by 0 days.

(21) Appl. No.: 09/727,265

(22) Filed: Nov. 30, 2000

Related U.S. Application Data (60) Provisional application No. 60/170,707, filed on Dec. 14, 1999.

(51) Int. Cl.[7] ............................................. B62D 47/00
(52) U.S. Cl. ....................................... 280/204; 296/181
(58) Field of Search ..................... 280/204; 296/181; D12/102, 103, 104, 105, 114

(56) References Cited

U.S. PATENT DOCUMENTS

| | | | |
|---|---|---|---|
| 2,071,489 A | * | 2/1937 | Alvord |
| 2,254,797 A | * | 9/1941 | Dubay |
| 2,334,387 A | | 11/1943 | Curty |
| D163,631 S | * | 6/1951 | Powell |
| D200,145 S | * | 1/1965 | Jones |
| D230,395 S | * | 2/1974 | Sporich |
| 3,860,252 A | * | 1/1975 | Martens et al. |
| 4,256,321 A | | 3/1981 | Trulove |
| 4,266,793 A | | 5/1981 | Pryor |
| D268,922 S | * | 5/1983 | Richer |
| 4,413,835 A | | 11/1983 | Hazelett |
| 4,756,541 A | | 7/1988 | Albitre |
| 5,054,800 A | | 10/1991 | Christensen et al. |
| 5,076,600 A | | 12/1991 | Fake |
| D340,429 S | | 10/1993 | Smith |
| 5,308,096 A | * | 5/1994 | Smith |
| 5,641,173 A | | 6/1997 | Cobb, Jr. |
| D384,010 S | * | 9/1997 | Chiu |
| D400,125 S | * | 10/1998 | Chiu |
| 6,213,539 B1 | * | 4/2001 | Williams et al. |

* cited by examiner

*Primary Examiner*—Kevin Hurley
(74) *Attorney, Agent, or Firm*—Albert W Watkins (57) ABSTRACT

A trailer for land vehicles including bicycles has a rain drop or similar shape and two in-line seats for passengers. The seats are convertible to act alternatively as a support for cargo. The trailer includes a convex, transparent dome at the front side, and a convex, tapering tail at the back side of the trailer. The cargo area is enclosed by a rigid floor and flaccid fabric side walls. Amenities such as cup holders and pockets may be sewn into the side walls along with a reflective strip. Wheels are provided with a slight lean towards the trailer, making the distance between wheel tops smaller than between wheel bottoms. This tilt stabilizes the trailer, which already has a low center of gravity, while roll bars and multi-point seat belts help protect passengers in the event of a roll-over or other unexpected event. An optional cover for the cargo area provides protection to the cargo, whether animate or inanimate, during adverse weather.

15 Claims, 4 Drawing Sheets

TRAILER AND METHOD OF USE

CROSS REFERENCE TO RELATED APPLICATIONS

This application claims priority to U.S. provisional application 60/170,707 filed Dec. 14, 1999, which names the same inventor.

BACKGROUND OF THE INVENTION

1. Field of the Invention

This invention pertains to land vehicles generally, and more specifically to trailing vehicles configured for optimum performance with occupant-propelled wheeled vehicles such as bicycles and the like. Most specifically, the most preferred embodiment of the invention illustrates an aerodynamic, light-weight and safe two-passenger trailer for a bicycle.

2. Description of the Related Art

Bicycles, by their very nature and design, provide an efficient, light-weight and low-cost means of rapid transportation for humans. Bicycle pedals are acted upon by a rider using some of the strongest muscles in the human body. These muscles are well-adapted to provide many repetitions of driving force, while the chain and sprockets typically found in a bicycle enable the rider to provide an optimum combination of force and repetition rate. Wheels with bearings enable the rider to coast without exertion, and thereby derive full benefit from inertia, gravity, tail winds, and the like. Bicycles are most commonly provided with two in-line wheels and a frame extending therebetween, making the bicycle relatively long and tall, but also very narrow. Consequently, a bicycle requires minimal space for storage when not in use, and the bicycle will also present almost no aerodynamic drag when in use.

Aerodynamic drag is a function of the square of the relative velocity between the bicycle and surrounding air, and the coefficient of drag is representative of the aerodynamic efficiency of surfaces which interact with the air during motion. With a bicycle and rider, the vast majority of drag comes from the rider's own body interacting with the surrounding air. Unfortunately, at even moderate speeds the interaction with air consumes the majority of power provided by the bicycle rider. Consequently, it is highly desirable to not add additional loads to the bicycle rider, since these loads can very adversely impact the speeds and advantages normally attained with a bicycle.

Owing to its narrow stature, there is very limited space available on a bicycle for carrying cargo. Cargo must usually be carried by backpack, bicycle packs including tire, basket or other similar packs and baskets, each which either are extremely limited in cargo capacity or which tend to add a great deal of bulk and air resistance to a bicycle. Furthermore, there is no space available for the safe transport of additional passengers. Bicycle seats for additional passengers tend to be very high and unbalanced, which can undesirably lead to serious accidents or injuries.

As an alternative to supporting cargo and additional persons upon the bicycle, trailers have been designed for attachment to the bicycle that may be towed behind the bicycle. These trailers offer a number of distinct advantages over bicycle mounted carriers, and may include a low center of gravity, a separate wheel support, "drafting" behind the cyclist to take advantage of the airstream about the cyclist, easy separation from the bicycle when not required, and flexibility regarding the size or shape of cargo and passengers. In some cases, the trailer may further be designed for particular stability or ruggedness not inherent in the design of a bicycle.

Undesirably, and as aforementioned, there is only limited power available from a cyclist. This power is very precious and is desirably conserved for transportation in order to make the ride as pleasant and enjoyable as possible. The power is not preferred for dragging an additional load.

Exemplary of the trailers designed for use with bicycles are U.S. Pat. No. 5,641,173 to Cobb, Verd Jr. and also Des. 3470,429 to Smith. In the Cobb patent, an aerodynamically designed trailer has a trailer tongue coupling forward through a universal joint to a bicycle seat post and a single wheel aft of a cargo carrier. The cargo carrier has a vertically extending aerodynamic design which is adaptable to carry either a single child in a seat, a clothes bar that might be used to hang various clothing or garment bags and the like, or a cargo shelf for supporting other diverse cargo. Unfortunately, while the Cobb patent may serve the purpose of carrying clothes or other narrow cargo, the Cobb design is a relatively tall and narrow configuration similar to the bicycle. This design gains little additional space over that already available, for example from a bag hanging from the top bar between seat post and handle bars. Furthermore, the Cobb design attaches at the sea post, which is very high on the bicycle, and includes only a single wheel for the trailer. While this design may suffice when used with ordinary durable cargo, the design is not adequate for those applications where the trailer is used to transport fragile or precious cargo or persons. This is due to the fact that, should the cyclist unexpectedly tip the bicycle, there is nothing to uncouple the carrier from the bicycle or support it independently. Consequently, a child being carried in the trailer will also be dropped to the ground in a violent manner when the cyclist goes down, which is highly undesirable. Should the cyclist leave the bicycle unattended even briefly, motion within the trailer may readily topple both the bicycle and the trailer. Furthermore, the Cobb trailer will only carry a single child, and even then in a backward position, which can be very disorienting and unsettling to some children.

The Smith design represents a much more common configuration for a bicycle trailer, but likewise serves to illustrate the difficult trade-offs that are made in the prior art trailers designed for bicycles. In the Smith patent, the carrier is illustrated having a transparent cover, a wide seat which might accommodate two smaller children in a side-by-side arrangement or one larger child, and a wide and stable wheel base. The lower center of gravity and wider wheel base serve to protect the child or children in the trailer, even if the cyclist or bicycle should topple, since the wide wheel base will be relatively difficult to topple. Unfortunately, the wide wheel base also presents a much larger front surface for interacting with the air, and a greater coefficient of drag. Drag is proportional to the drag coefficient, frontal area and the square of vehicle speed. With a larger front surface and coefficient of drag, the drag is much greater. Unfortunately, the trailer adds a great burden onto the cyclist, preventing a cyclist with the trailers of this design from keeping pace with bicycles without trailers. What is desired then is a trailer capable of transporting more than one child, while protecting the child and still preserving low weight and aerodynamic efficiency.

SUMMARY OF THE INVENTION

In a first manifestation, the invention is a trailer which is aerodynamically efficient when towed behind a land vehicle. A carriage within which cargo including persons may be transported has a front, a back spaced from the front, and sides extending from front to back and forming a space for cargo. A shield interposed between carriage and land vehicle protects cargo from hazards during transit. The shield has a convex shape with an apex and a base, the apex displaced from base in a direction parallel to the direction of travel and towards the land vehicle. A tail member has a convex shape with a base adjacent the carriage and an apex displaced from the base in a direction away from the land vehicle. A wheel set moves and maintains the carriage, shield and tail member spaced from the ground. A tongue maintains the trailer spaced a predictable distance from the land vehicle.

In a second manifestation, the invention is a means for transporting cargo aerodynamically behind a bicycle propelled by a cyclist. A means is provided for supporting and enclosing cargo and has a main cargo space, a leading apex, a leading convex surface between the main cargo space and leading apex, a trailing apex, a trailing convex surface between the main cargo space and the trailing apex, and an aerodynamic transition between the leading and trailing apex. A means transmits light reflected from enclosed cargo to cyclist. Another means separates the enclosing means from a surface upon which bicycle and cargo transporting means travel. A means also couples bicycle to enclosing means.

In a third manifestation, the invention is a bicycle trailer. A polyhedral passenger compartment which is generally elliptical in cross-section is taller than wide and has a rigid plastic floor, flaccid side walls, and a generally elliptical frame support about which the passenger compartment is formed. A transparent, convex shield is provided at one end of the polyhedral passenger compartment and a flaccid convex tail cover is provided at a second end of the polyhedral passenger compartment opposite the transparent shield. First and second seats that are in line with each other are located within the passenger compartment. These seats are convertible between passenger seating and cargo supporting. First and second wheels and a frame for supporting the polyhedral passenger compartment are displaced from the ground, the first wheel defining a first plane through which a surface of the first wheel surface rotates and second wheel defining a second plane through which a surface of the second wheel rotates, the first and second planes which are not parallel with each other.

OBJECTS OF THE INVENTION

A first object of the invention is to provide a stable, safe and secure means for a cyclist to transport children. A second object of the invention is to enable the cyclist to carry either cargo, one child with cargo, or two children in a stable, safe and secure manner. A third object of the invention is to provide a stable support base which prevents toppling, and a coupling to a bicycle or other land vehicle which uncouples rotation or tipping of the towing vehicle from the trailer. Another object of the invention is to provide sight windows to enable the cyclist to observe the status of the cargo and allow animate cargo to view their surroundings during transit. A further object is to enable the cyclist to transport cargo and children without sacrificing efficiency during transport. Yet another object of the invention is to enable children to enjoy riding in the trailer, regardless of weather conditions. A further object of the invention is to provide for small amenities that help to ensure the safety of the children while also making the ride more pleasurable. These and other objects of the invention are achieved in the preferred embodiment of the invention, which will best understood when considered in association with the appended drawing figures.

DESCRIPTION OF THE PREFERRED EMBODIMENT

A preferred embodiment trailer 10 includes a carriage 12 for carrying children or other animate or inanimate cargo, a tongue 14 for connecting carriage 12 to a bicycle or other land vehicle, and a wheel set 15 for providing mobility to carriage 12. Carriage 12 includes a front aerodynamic shield 16, a body member 18 including a floor 19, a tail member 20, and a frame 22. The shape of carriage 12 may vary from the general shape illustrated, but the preferred embodiment is hollow and generally cylindrical with closed ends and a partially open top. To obtain the lowest aerodynamic drag, carriage 12 may be similar in shape to a raindrop with shield 16 taking the shape of the leading, more rounded surface or bottom of a raindrop, body member 18 taking the shape of the gently tapering body of a raindrop, and tail member 20 taking the more pointed shape of the top or trailing edge of a raindrop.

The length of carriage 12 may also vary from one design to the next. However, for normal use with a bicycle, the length of carriage 12 will preferably range from approximately eighty-four inches to fifty-four inches, which allows space for two children and some cargo. Greater lengths undesirably add weight and cost, increase the difficulty of storage, and adversely affect safety during crossing of intersections and the like. Shorter lengths undesirably limit the capacity of carriage 12 to carry children and cargo. In the most preferred embodiment, the length of carriage 12 is sixty-four inches.

Aerodynamic shield 16 may be designed from one of a variety of geometric shapes, including rectangular polyhedrons, oval, elliptical or circular polygons, a hollow semi-sphere, a triangular polyhedron or other object. Preferably, shield 16 will be convex, to smoothly direct air flow in a laminar manner about the leading edge of carriage 12 with a minimum of turbulence and drag. Shield 16 will most preferably be similar in shape to the bottom portion of a raindrop. The height of shield 16, from a bottom edge to top edge, is not restricted to any particular dimension, but will preferably range from approximately thirty-six inches to twenty-two inches for the lengths of carriage 12 noted herein above. In the most preferred embodiment, the height of shield 16 is approximately twenty-seven inches. The width of shield 16, from the left side to the right side measured along a line generally parallel to the ground, is also not restricted, but will preferably range from approximately twenty-four inches to twelve inches. In the most preferred embodiment, the width will be approximately sixteen and one-half inches. As can be readily seen from the drawing figures and the numbers herein, shield 16 will most preferably be higher than wide, which allows trailer 10 to track generally within the airstream created by a cyclist. This greatly reduces the drag created by trailer 10. Owing to the aerodynamic generally convex shape of shield 16, the coefficient of drag is similarly quite low, reducing the drag of the present invention greatly over the more box-like configurations such as illustrated by the Smith patent referenced herein above.

Shield 16 may be made of any variety of materials. However, shield 16 is preferably unbreakable to protect and preserve the safety of any animate cargo, such as children and animals, and transparent to allow viewing therethrough. It is infrequent, but not unheard of, for rocks, branches and other debris to be thrown from the tires of the towing land vehicle, even when this vehicle is a bicycle. This debris should bounce off of shield 16 in the way of any windshield or the like known in the art of land vehicles. However, the material will also preferably preserve the low weight of trailer 10 to not unduly load down a cyclist when starting into motion or when climbing hills. Preferably the material will be transparent or translucent, to allow any trailer passengers good viewing therethrough, while also most preferably allowing a cyclist to view the trailer passengers as well, to visually check on their safety and well-being. The material may be unbreakable glasses or ceramics, hard or flexible plastic, fabric, composites, metals or other suitable material. In the most preferred embodiment, the material used in shield 16 is PETG (polyethylene terephthalate glycolate), owing to cost, transparency, durability, and working characteristics, though polycarbonates, acrylics, vinyls, copolymers and other similar or diverse materials having the desired characteristics are also contemplated.

The shape of body member 18 may also vary from one design to the next. The shape may be generally that of a rectangular polyhedron, a cylinder, sphere, or other suitable shape that allows space for passengers or cargo. However, preferably, the shape of the body member 18 will be cylindrical or slightly conical. The shape of the body member 18 may most preferably be similar in shape to the body, or middle portion, of a raindrop for the greatest aerodynamic efficiency. Nevertheless, the tapering of the body of a raindrop does add somewhat to manufacturing and, consequently, adds to the cost, as well as adversely impacting the amount of cargo or size of children that may be accommodated. These opposing factors must be considered in the design of body member 18.

Body member 18 will also most preferably include an open top for entrance into and exit from within. At least one chair 24 will also preferably be provided. Body member 18 may include more than one seat, such as a first seat 24a and a second seat 24b as illustrated in the preferred embodiment. One or more chairs 24 may be secured within body member 18 by any suitable securing mechanism. In the preferred embodiment and best illustrated in FIG. 5, chairs 24a, 24b include fasteners such as snaps 82, 83, 382, 383 that allow chairs 24a, 24b to be positioned either upright for human use, or laid down for other cargo. In an upright position, as shown by the figure, front seat 24a is attached to lower side rod 30 through two fastening straps 180, 280. These fastening straps 180, 280 may be terminated in a number of alternative ways, but most preferably snaps may be used which allow seat 24a to be removed when needed, for such occasions as cleaning, rearranging for special cargo, and the like. The use of two straps 180, 280 and snaps anchored to lower side rod 30 ensure that seat bottom 84 may be reasonably stretched so as to not unduly deform, even where seat bottom 84 is merely constructed from fabric. Similarly, strap 80 fastens to snap 82 to keep seat back 86 in an upright position. In a like manner, seat 24b is anchored through straps 380, 480 and 580 to lower and upper side rods 30, 32. When two children are to be carried within carriage 12, seats 24a, 24b will most preferably be in the positions shown in FIG. 5. However, when only one child is to be carried, or cargo which would desirably be rested on a relatively flat surface such as provided for by seat bottom 384, then seat back 386 may be lowered by releasing strap 380 from snap 382 and lowering seat back 386 as shown by the dashed line until strap 380 may be snapped to snap 383. Should no children require transport, front seat back 86 may similarly be lowered along the dashed line shown in FIG. 5, and strap 80 snapped into snap 83. In this configuration of seats 24a, 24b, with both seat backs lowered, a large flat surface is provided for carrying cargo. Seat belts 90 and 92 will most preferably also be provided, and these belts 90, 92 may also be attached through straps 80, 180, 280, 380, 480, 580, though other points of attachment may also be provided at the option of the designer.

Body member 18 will preferably be long enough to hold at least two small children, while not excessively extending the length of trailer 10 to an unsafe or hard-to-transport length. This length may preferably range from seventy-eight inches to fifty-two inches. More preferably, the length will range from sixty-six inches to fifty-six inches, and most preferably the length will be approximately fifty-eight inches. The inside width of body member 18 may range from twenty-eight inches to less than twelve inches, depending upon the design and objectives. However, preferably, the width of body member 18 will range from twenty inches to fourteen inches, and most preferably will be approximately sixteen and one-half inches. This width, when used in combination with the most preferred height, establishes an excellent transposition into the airstream created by a cyclist, thereby reducing the total drag of trailer 10, while also comfortably accommodating children and a variety of cargo.

Body member 18 may be manufactured from a variety of materials. The material should be lightweight and resilient, and preferably not be easily crushable or punctured, to help protect cargo. The material may be aluminum, hard plastic, or other suitable material, though most preferably will be selected from among a number of lightweight and durable fabrics or films having characteristics similar to nylon and polyester. If woven fabrics are used, which offer excellent strength and tear-resistance for minimal weight, they will most preferably be waterproofed to prevent the passage of moisture therethrough during rain or in the event a puddle or other water body is traversed. One advantage of using a fabric is the ease at which additional amenities, such as cup holders or other pouches or pockets may be provided. In the most preferred embodiment, a woven fabric is used and a special reflective strip 58 such as manufactured by Minnesota Mining and Manufacturing for use as an outdoor reflector is adhered to the fabric, either adhesively, or through sewing or other suitable means. The floor 19 of body member 18 in the preferred embodiment is manufactured from solid, rigid plastic to provide greater protection against road hazards that might otherwise harm cargo.

To reduce drag, and similar to shield 16 and body member 18, tail member 20 should be aerodynamic. Tail member 20 may be approximately conical or have other suitable shape, though most preferably it will resemble the top portion of a raindrop to be most aerodynamic. As with body member 18, the cargo capacity and coefficient of drag tend to work in opposition, since a larger, narrower tail member 20 will require more room for transport and more time to cross an intersection, and will also require more material for fabrication, while providing little extra cargo space. Tail member 20 may be manufactured from the same or similar material to either that of body member 18 or shield 16. This material, as aforementioned, may be aluminum, hard plastic, or other suitable material, vacuum formed plastic such as PETG, or the like. However, most preferably, tail member 20 is made from the same contiguous piece of woven fabric as body member 18, thereby simplifying manufacture and keeping parts counts lower. Longitudinal tail curve 29 is provided to add framework for supporting fabric in a desired configuration.

The length, width and height of tail member 20 may also vary, depending upon design objectives. The length, from the tip of the cone to the base of the cone, may range from approximately twenty inches to less than two inches. Preferably, the length will range from approximately eighteen inches to six inches, Most preferably, the length will be approximately twelve inches. The width of the base of the cone in the preferred embodiment may range from approximately thirty-six inches to less than ten inches. Preferably, the width will range from approximately twenty-four inches to twelve inches, and will most preferably be approximately sixteen and one-half inches. The height, from the lowest edge to the highest edge, may range from approximately forty-eight inches to less than twenty inches. Preferably, the height will range from approximately thirty-six inches to twenty-two inches. Most preferably, the height will be approximately twenty-seven inches.

Frame 22 may be manufactured from a wide variety of materials, depending upon various design objectives, ratings and dimensions. Frame 22 in the preferred embodiment will be rated to support more than 100 pounds, and will most preferably be extremely light weight and corrosion resistant. Consequently, frame 22 will preferably be made from aluminum tubing, though other materials including copper, steel, plastics or other suitable material may be used as will be apparent to a designer in view of the present disclosure. Frame 22 in the preferred embodiment includes a front rod 27, a tail rod 28, longitudinal tail curve 29, a lower side rod 30, an upper side rod 32, a first axle assembly rod 34 and a second axle assembly rod 36. These rods 27, 28, 29, 30, 32, 34, and 36 may be hollow or solid, though they will preferably be hollow to maintain strength to weight ratios at a maximum. The rods may be bent into different shapes as described below, and may have different or varying diameters. The diameter will preferably range from two inches to one-quarter inch. Smaller diameters tend to lose strength, while larger diameters add cost, size and weight that may be undesirable. Preferably, the diameter will range from one and one-half inch to one-half inch. In the most preferred embodiment, the diameter of these rods is approximately one inch.

Front rod 27 may be attached, using any suitable attachment mechanism, to shield 16, and tail rod 28 will also preferably be attached to tail member 20. Rivets, screws, bolts, adhesives and other known fasteners may be used for each attachment, as long as the fasteners provide durable attachment to prevent shield 16 from separating from rod 27 and tail member 20 from separating from tail rod 28 during use. Preferably, front rod 27 is oval in shape, and corresponds in size and shape to the edge of shield 16. In the most preferred embodiment, which has been designed for maximum cargo capacity and minimum manufacturing costs, the circumference of both front rod 27 and tail rod 28 will be approximately eighty-seven inches. The unique oval design of front rod 27 and tail rod 28 provides excellent protection to passengers or other cargo in the event trailer 10 should roll over or be impacted from the side, top or bottom. In fact, rods 27, 28 act as roll bars.

Figure 1:
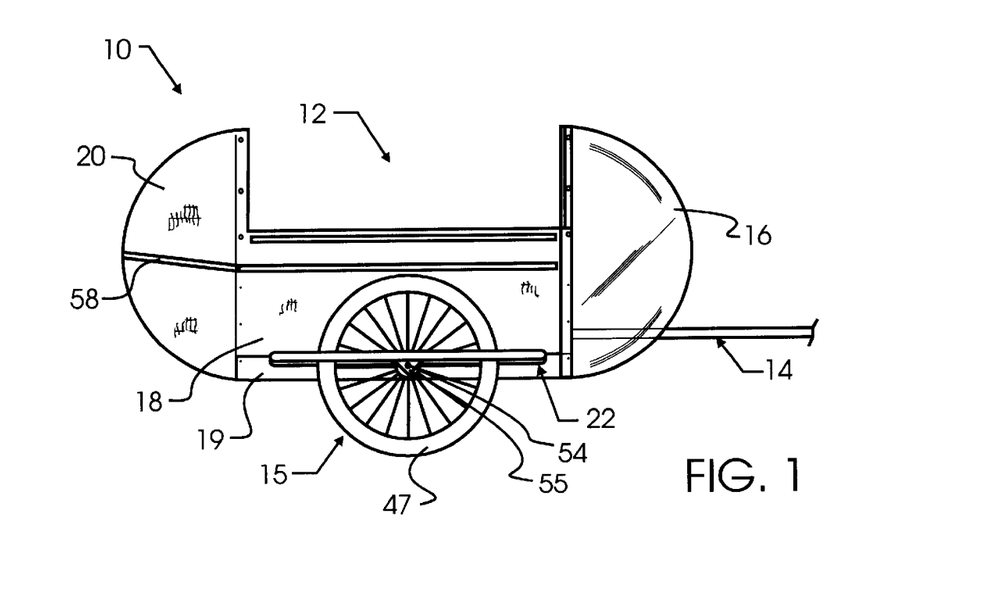
FIG. 1 illustrates a preferred embodiment trailer designed in accord with the teachings of the invention with the optional weather shield removed, from a right side plan view.
Figure 2:
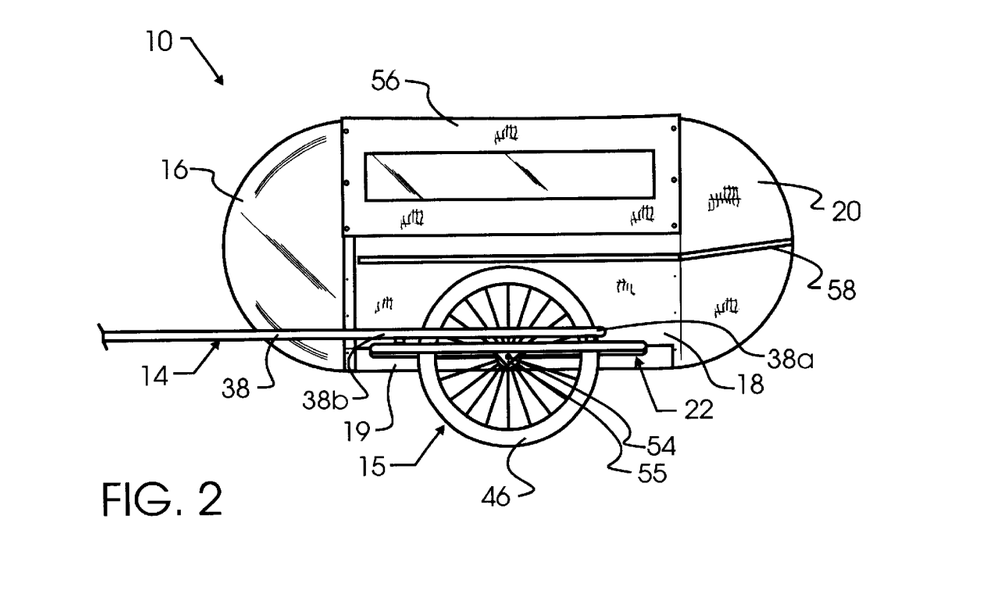
FIG. 2 illustrates the preferred embodiment trailer of FIG. 1 from a left side plan view with the optional weather shield installed.
Figure 3:
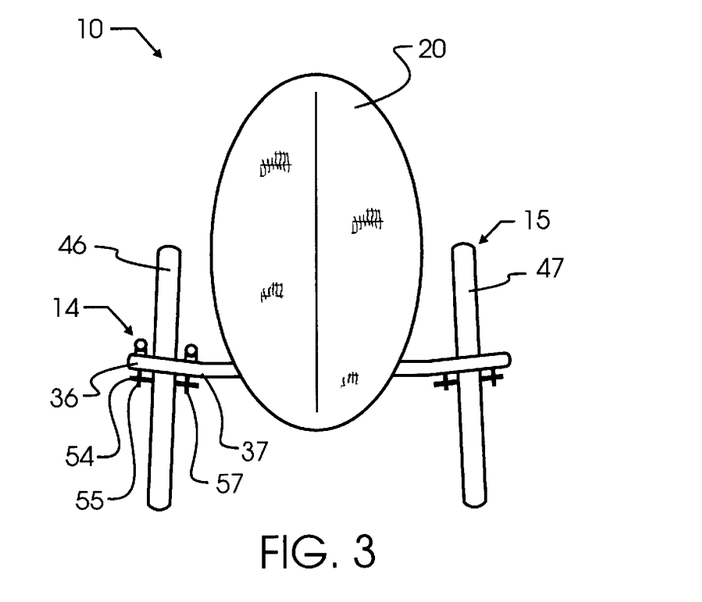
FIG. 3 illustrates the preferred embodiment trailer of FIGS. 1 and 2 from a back, plan view.
Figure 4:
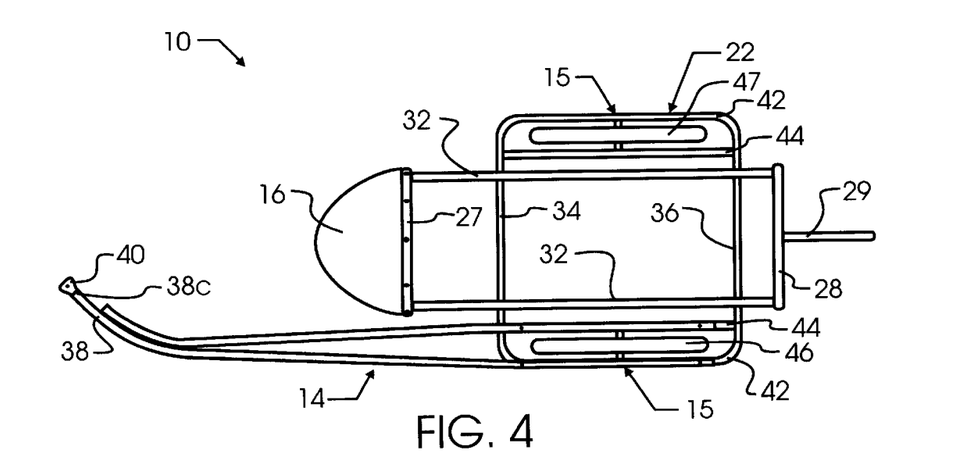
FIG. 4 illustrates the preferred embodiment trailer of FIGS. 1–3 from a top plan view, with the flaccid exterior 20 and seats 24a, 24b removed, to reveal the underlying frame 22.
Figure 5:
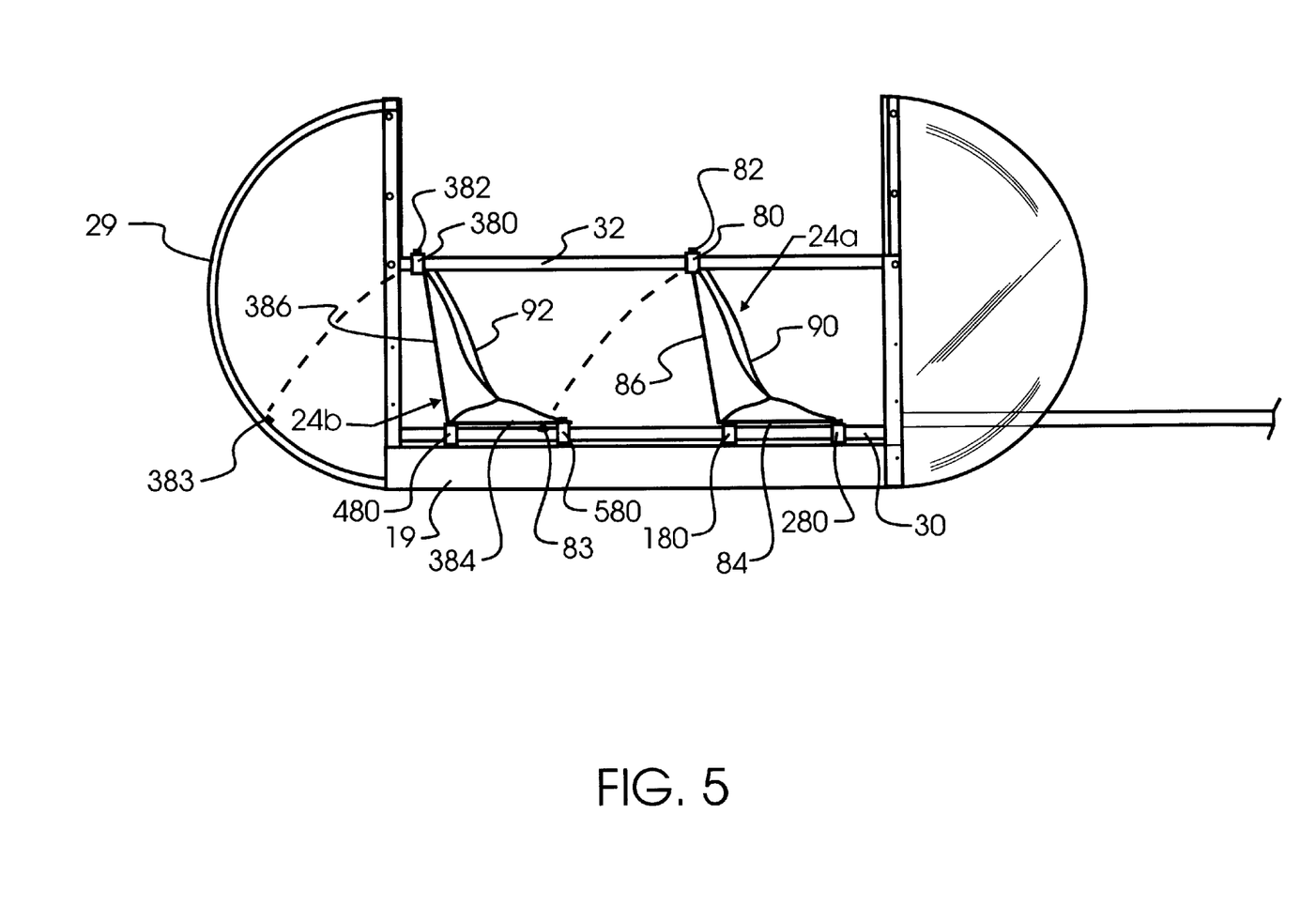
FIG. 5 illustrates the preferred embodiment trailer 10 from a side view with flaccid exterior and wheel set removed for clarity of the seat structure and operation.

Lower side rod 30, visible in FIG. 5, and upper side rod 32 extend longitudinally between front rod 27 and tail rod 28, and may be attached using any suitable attachment mechanism such as welding or mechanical fastening. In the most preferred embodiment, plastic fasteners are used that allow resilience and vibration dampening within frame 22 and simultaneously allow disassembly for warehousing, shipping and storage.

First axle assembly rod 34 and second axle assembly rod 36 extend from wheel 46 transversely through body member 18 to wheel 47. First axle assembly rod 34 will preferably extend under first seat 24a, while second axle assembly rod 36 extends under second seat 24b. The first and second axle assembly rods 34, 36 are preferably straight, horizontal poles to simplify the design and keep manufacturing costs low, but there is not requirement that they be so, and they may in fact take on a wide variety of geometries and configurations, so long as they provide the transverse stability desired and, preferably, provide support for each chair 24. In the most preferred embodiment, axle assembly rods 34, 36 will be approximately thirty-three inches long.

Tongue 14 extends longitudinally from frame 22 to couple carriage 12 to a towing land vehicle such as a bicycle. Tongue 14 may comprise one or more components or tubes firmly combined with fasteners, welds or other suitable means, or may be a single integral or homogenous component, or combinations thereof. Tongue 14 may include at least one hitching rod 38 and a hitch 40. The material, size and cross-section of hitching rod 38 are not critical to the invention, so long as there is sufficient strength, durability, corrosion resistance, and adequate reach to couple with other land vehicles. In the most preferred embodiment, hitching rod 38 is manufactured from aluminum tubing approximately seventy-two inches in length and having a diameter of approximately one inch. A rearward end 38a of hitching rod 38 may be attached to a portion of second axle assembly rod 36 which extends beyond the outside of the body member 18 using any suitable attachment mechanism such as welding or mechanical fastening. A middle portion 38b of hitching rod 38 may be attached to a portion of first axle assembly rod 34 which extends beyond the outside of the body member 18 using any suitable attachment mechanism such as welding or mechanical fastening. In the preferred embodiment, plastic couplers are provided with fastening hardware to provide improved resilience and ready assembly and disassembly.

Hitch 40 may be attached to a forward portion 38c of hitching rod 38. Hitch 40 may be any known hitch used for attaching a bicycle trailer to a bicycle. Hitch 40 is preferably attached to the forward portion of the hitching rod 38 using any suitable attachment mechanism such as welding or mechanical fastening. Hitch 40 may be removably attached to a bicycle at the frame adjacent the back wheel of the bicycle or at the bicycle seat post.

Figure 6:
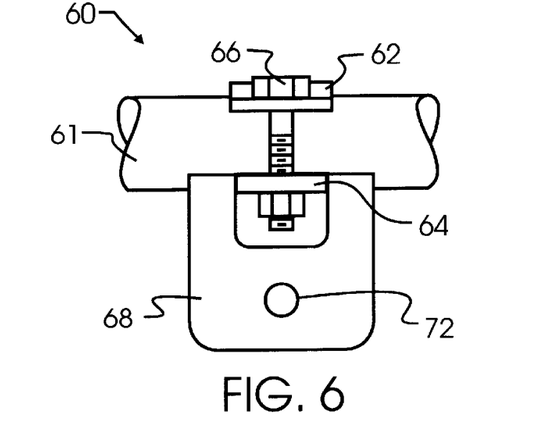
FIGS. 6–8 illustrate a preferred clamp having utility in the present invention.
Figure 7:
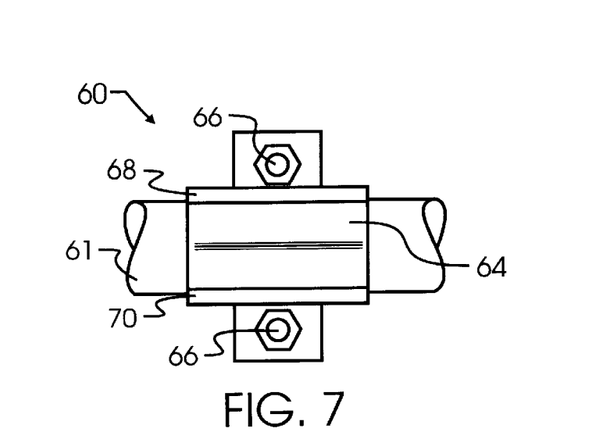
Figure 8:
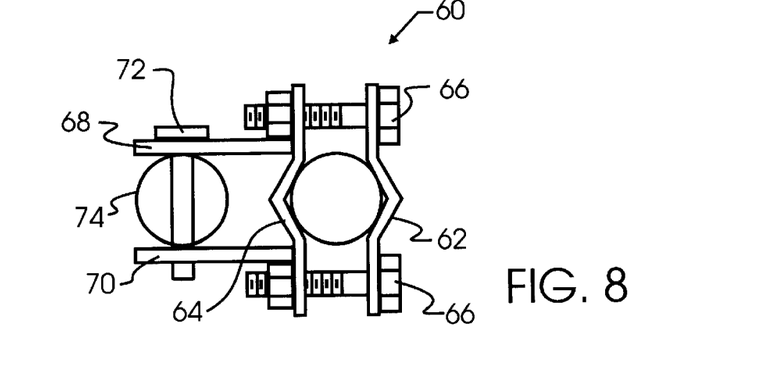

Preferred hitch 40, illustrated in FIGS. 6–8, includes a bicycle frame fastening mechanism 60 for securing to a generally horizontal bicycle frame tube 61. Most preferably, the point of attachment will be the chain stay of the bicycle. The chain stay is the part of a bicycle that runs parallel to the ground and that the rear tire attaches to. The chain stay is much closer to ground level than the seat post of a bicycle. Should the bicycle fall over, there is much less motion generated in the tongue 14 when attached to the chain stay.

Fastening mechanism 60 includes first and second plates 62, 64 selectively joined with fasteners 66. Plate 64 may be joined to first and second receiving plates 68, 70. Receiving plates 68, 70 may be separate plates as illustrated, or may alternatively be fabricated from a single piece such as a U-shaped plate. Receiving plates 68, 70 provide for a pin 72 that secures to flexible link 74, which in turn is attached to hitching rod 38.

Wheel set 15 includes a C-shaped rod 42, an inside rod 44, and at least one wheel 46. The materials, shape and construction of C-shaped rod 42 and inside rod 44 are not critical to the invention, provided there is sufficient strength and corrosion resistance for the application. In the preferred embodiment, these parts are fabricated from hollow aluminum tubing of approximately one inch diameter. Preferably, rod 42 is C-shaped to have no sharp corners which might otherwise present hazards to persons nearby. The inside rod 44 may be a straight, horizontal pole.

The length of C-shaped rod 42 may vary, most preferably being long enough to allow a rider to step up onto rod 42 and will be long enough to not interfere with the wheel 46. A larger diameter wheel 46 provides for a smoother ride and ready traversing of difficult terrain or pot-holes in the roadway or trail, and provides adequate ground clearance for carriage 12. Consequently, C-shaped rod 42, from end to end, may typically range in length from sixty inches to less than ten inches, but more preferably, the length of C-shaped rod 42, from end to end, will range from forty inches to thirty inches, and will most preferably be approximately thirty-eight inches.

Wheel 46 includes an axle 54 slightly offset from parallel to the ground. A five degree angle of offset 37 is most preferred, which increases stability, eliminates shimmy, and enhances styling. Axle 54 may be removably attached to C-shaped rod 42 on one end, but in the preferred embodiment will be attached through plate 55, extend through the center of wheel 46, and removably attached to the inside plate 57 at the other end. The low center of gravity of trailer 10, additionally combined with the five degree tilt at angle 37, and the two-wheel support yields a very stable trailer 10 which is quite difficult to tip. Safety is therefore greatly enhanced in the present invention over the prior art of record.

Trailer 10 may optionally include a weather cover 56. The cover 56 may be removably attached to carriage 12 to provide shelter to those inside carriage 12 during rain or other adverse weather conditions. Cover 56 will also provide shelter from sun or insects. The materials for cover 56 are not critical and may include plastic, vinyl, screen, netting or other suitable material, though cover 56 will preferably be waterproof to protect the contents of carriage 12 during adverse weather. Cover 56 is removably attached to front member 16, tail member 20 and the sides of body member 18 using any suitable attachment mechanism such as snaps, hooks, or hooks and loops. In the preferred embodiment, cover 56 is removably attached to carriage 12 using snaps and hook and loop fasteners such as sold under the trademark Velcro.

In operation, tongue 14 will be attached to a bicycle through hitch 40. One or two small children may be placed onto chairs 24a and 24b located within body member 18. Cargo may be carried with the chairs 24 upright, or chairs 24 may be lowered as illustrated by dashed line in FIG. 5. Consequently, it will be apparent that both cargo and children may be carried with an appropriate set-up. Cover 56 may optionally be attached. Then a bicycle rider may mount the bicycle and ride. The rider will be able to see children and cargo through shield 16. Children or other animate cargo will be able to watch the scenic views through shield 16 as the rider is propelling the bicycle.

While the foregoing details what is felt to be the preferred embodiment of the invention and some suitable alternatives, no material limitations to the scope of the claimed invention are intended. Further, features and design alternatives that would be obvious to one of ordinary skill in the art are considered to be incorporated herein. The scope of the invention is set forth and particularly described in the claims hereinbelow:

I claim:

1. A trailer which is aerodynamically efficient when moved in a first forward direction defining a first axis for towing behind a land vehicle, comprising:

a carriage extending longitudinally parallel to said first axis within which cargo including persons may be transported, said carriage having a front, a back spaced from said front by a distance in a direction parallel to said first axis, and sides extending from said front to said back and forming a space the between for containment of said cargo;

a shield interposed between said carriage and said land vehicle to protect said cargo from hazards during transit, said shield having a convex shape with an apex and a base, said apex of said shield displaced from said base in a direction parallel to said first axis towards said land vehicle;

a tail member having a convex shape with a base adjacent said carriage and an apex displaced from said base in a direction parallel to said first axis away from said land vehicle;

a wheel set for contacting a surface upon which said trailer moves and maintaing said carriage, shield and tail member spaced from said surface;

a tongue for maintaining said trailer spaced a predictable distance from said land vehicle;

a first seat; and a second seat displaced along said first axis from said first seat.

2. The aerodynamically efficient trailer of claim 1 wherein said first seat and said second seat are bendable to form a single surface that is spaced from an exterior wall of said carriage for supporting cargo.

3. The aerodynamically efficient trailer of claim 1 wherein said wheel set futher comprises at least two wheels, each of said at least two wheels having bearing means about which said wheels rotate.

4. The aerodynamically efficient trailer of claim 3 wherein each of said at least two wheels are tilted at an angle offset from vertical, whereby, as a consequence of said tilt, said trailer has greater stability.

5. A trailer which is aerodynsnically efficient when moved in a first forward direction defining a first axis for towing behind a land vehicle, comprising:

a carriage within which cargo including persons may be transported, said carriage having a front, a back spaced from said front by a distance in a direction parallel to said first axis, and sides extending from said front to said back and forming a space therebetween for containment of said cargo;

a shield interposed between said carriage and said land vehicle to protect said cargo from hazards during transit, said shield having a convex shape with an apex and a base, said apex of said shield displaced from said base in a direction parallel to said first axis towards said land vehicle;

a tail member having a convex shape with a base adjacent said carriage and an apex displaced from said base in a direction parallel to said first axis away from said land vehicle;

a wheel set for contacting a surface upon which said trailer moves and maintaining said carage, shield and tail member spaced from said surface;

a tongue for maintaining said trailer spaced apredictable distance from said land vehicle; and flaccid walls defining exterior walls of said carriage.

6. The aerodynaically efficient trailer of claim 5 futher comprising a rigid floor defining an exterior floor of said carriage.

7. A trailer which is aerodynamically efficient when moved in a first forward direction defining a first axis for towing behind a land vehicle, comprising:

a carriage within which cargo including persons may be transported, said carriage having a front, a back spaced form said front by a distance in a direction parallel to said first axis, and sides extending from said front to said back and forming a space therebetween for containment of said cargo;

a shield interposed between said carriage and said land vehicle to protect said cargo from hazards during transit, said shield having a convex shape with an apex and a base, said apex of said shield displaced from said base in a direction parallel to said first axis towards said land vehicle;

a tail member having a convex shape with a base adjacent said carnage and an apex displaced firm said base in a direction parallel to said first axis away from said land vehicle;

a wheel set for contacting a surface upon which said trailer moves and maintaining said carriage, shield and tail member spaced from said surface;

a tongue for maintaining said trailer spaced a predictable distance from said land vehicle;

wherein said tail member apex is displaced a first tail length from said tail member base in a direction parallel to said first axis, said shield apex displaced a first shield length from said shield base in a direction parallel to said first axis; and wherein said first tail length is greater than said first shield length.

8. The aerodynamically efficient trailer of claim 7 wherein said carriage decreases in circumference as a distance of circumference measurement from said shield base increases.

9. The aerodynamically efficient trailer of claim 7 wherein said carriage circumference remains constant as a distance of circumference measurement from said shield base increases.

10. The aemdynamically efficient trailer of claim 8 wherein said shield, carriage and tail member in combination assume an external geometry of a rain drop traveling along said first axis.

11. A means for transporting cargo aerodynamically behind a bicycle propelled by a cyclist, comprising:

a means for supporting and enclosing cargo sharing a main cargo space, a leading apex, a leading convex surface between said main cargo space and said leading apex, a trailing apex, a trailing convex surface between said main cargo space and said trailing apex, and an aerodynamic transition between said leading and trailing apex;

a means for transmitting light reflect from said enclosed cargo to said cyclist;

a means for separating said enclosing means form a surface upon which said bicycle and said cargo trap-shooting means travel;

a means for coupling said bicycle to said enclosing means; and convertible means for supporting a person in a sitting position which maybe converted into a means for supporting cargo between said leading and trailing apexes.

12. A means for transporting cargo aerodynamically behind a bicycle propelled by a cyclist, comprising:

a means for supporting and enclosing cargo having a main cargo space, a leading apex, a leading convex surface between said main cargo space and said leading apex, a trailing apex, a trailing convex surface between said main cargo space and said tailing apex, and an aerodynamic transition between said leading and trailing apex;

a means for transmitting light reflected from said enclosed cargo to said cyclist;

a means for separating said enclosing means from a surface upon which said bicycle and said cargo transporting means travel; and a means for coupling said bicycle to said enclosing means;

wherein said leading convex surface has an ellipsoidal base which is taller than wide.

13. A means for transporting cargo aerodynamically behind a bicycle propelled by a cyclist, comprising:

a means for supporting and enclosing cargo having a main cargo space, a leading apex, a leading convex surface between said main cargo space and said leading apex, a trailing apex, a trailing convex surface between said main cargo space and said tailing apex, and an aerodynamic transition between said leading and trailing apex;

a means for transmitting light reflected from said enclosed cargo to said cyclist;

a means for separating said enclosing means from a surface upon which said bicycle and said cargo transporting means travel; and a means for coupling said bicycle to said enclosing means;

wherein said leading convex surface comprises said means for transmitting light.

14. A bicycle trailer, comprising:

a polyhedral passenger compartment which is generally elliptical in cross-sertion being taller than wide and having a rigid plastic floor, flaccid side walls, and a generally elliptical frame support about which said passenger compartment is formed and farther having a transparent, convex shield at a first longitudinal end of said polyhedral passenger compartment and a flaccid convex tail cover at a second longitudinal end of said polyhedral passenger compartment opposite said first longitudinal end;

first and second seats in line with each other within said passenger compartments which are convertible between passenger seating and cargo supporting; and first and second wheels and a frame for supporting said polyhedral passenger compartment displaced from the ground, said first wheel defining a first plane through which a she of said first wheel surface rotates and second wheel defining a second plane through which a surface of said second wheel rotates, said first and second planes which are not parallel with each other.

15. A trailer which is aerodynmically efficient when moved in a first forward direction defining a first axis for towing behind a land vehicle, comprising:

a carriage within which cargo including persons may be transported, said carriage having a front, a back spaced from said front by a distance in a direction parallel to said first axis, and sides extending form said font to said back and forming a space therebetween for containment of said cargo;

a transparent shield interposed between said carriage and said land vehicle to protect said cargo from hazards during transit, said transparent shield having a convex shape with an apex and a base, said apex of said transparent shield displaced from said base in a direction parallel to said first axis towards said land vehicle;

a tail member having a convex shape with abase adjacent said carriage andan apex displaced from said base in a direction parallel to said first axis away from said land vehicle;

a wheel set for contacting a surface upon which said trailer moves and maintaining said carriage, shield and tail member spaced from said surface; and a tongue for maintaining said trailer spaced a predictable distance from said land vehicle.

\* \* \* \* \*